US012540342B2

United States Patent
Zhang et al.

(10) Patent No.: US 12,540,342 B2
(45) Date of Patent: Feb. 3, 2026

(54) LONG-CHAIN COMPOSITION, LONG-CHAIN COMPOSITION SET, ITS PREPARATION AND APPLICATION THEREOF

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Lin Zhang, Liaoning (CN); Yachao Fan, Liaoning (CN); Wenjing Shi, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(*) Notice: Subject to any disclaimer, the term of this patent is extended or adjusted under 35 U.S.C. 154(b) by 944 days.

(21) Appl. No.: 17/755,315

(22) PCT Filed: Oct. 26, 2020

(86) PCT No.: PCT/CN2020/123700
§ 371 (c)(1),
(2) Date: Apr. 26, 2022

(87) PCT Pub. No.: WO2021/083079
PCT Pub. Date: May 6, 2021

(65) Prior Publication Data
US 2022/0372529 A1    Nov. 24, 2022

(30) Foreign Application Priority Data
Oct. 28, 2019   (CN) .......................... 201911033697.1

(51) Int. Cl.
C12P 7/6409   (2022.01)
C07C 53/126   (2006.01)
C12N 1/16   (2006.01)

(52) U.S. Cl.
CPC .......... *C12P 7/6409* (2013.01); *C07C 53/126* (2013.01); *C12N 1/16* (2013.01)

(58) Field of Classification Search
None
See application file for complete search history.

(56) References Cited

U.S. PATENT DOCUMENTS

2014/0081065 A1* 3/2014 Sengupta ............... C10G 3/44
585/733
2019/0271012 A1 9/2019 Xu et al.

FOREIGN PATENT DOCUMENTS

| CN | 1611608 A | 5/2005 |
| CN | 1259424 C | 6/2006 |
| CN | 102115767 A | 7/2011 |
| CN | 102115768 A | 7/2011 |
| CN | 102994402 A | 3/2013 |
| CN | 103805643 A | 5/2014 |
| CN | 110218745 A | 9/2019 |
| JP | 2012511907 A | 5/2012 |
| KR | 20180032454 A | 3/2018 |
| WO | 2010068904 A2 | 6/2010 |
| WO | 2014144728 A1 | 9/2014 |
| WO | WO-2019158683 A1 * | 8/2019 ................ C12P 7/40 |

OTHER PUBLICATIONS

Machine generated English language translation of Fang (CN1611608, published on May 4, 2005), obtained Jul. 2025. (Year: 2025).*
Machine generated English language translation of Liu (CN102994402, published on Mar. 27, 2013), obtained Jul. 2025 (Year: 2025).*
Funk, Irina et al.; "Production of dodecanedioic acid via biotransformation of low cost plant-oil derivatives using Candida tropicalis"; J Ind Microbiol Biotechnol; vol. 44; Year: 2017; pp. 1491-1502.
Yi, Zu-Hua et al.; "Metabolic Formation of Dodecanedioic Acid from n-Dodecane by a Mutant of Candida tropicalis "; European J Appl Microbiol Biotechnol; vol. 14; Year: 1982; pp. 254-258.
Bai, Long et al., "Formulation and Stabilization of Concentrated Edible Oil-in-Water Emulsions Based on Electrostatic Complexes of a Food-Grade Cationic Surfactant (Ethyl Lauroyl Arginate) and Cellulose Nanocrystals", Biomacromolecules, vol. 19, Apr. 2, 2018, pp. 1674-1685.
Van Beilen, Jan B. et al., "Substrate specificity of the alkane hydroxylase system of Pseudomonas oleovorans Gpo1", Enzyme Microb. Technol., vol. 16, Oct. 31, 1994, pp. 904-911.
Zhang, Xuelai et al., "Preparation and Properties of Lauric Acid-decanoic /Tetradecyl Alcohol-dodecane Composite as PCMs for Thermal Energy Storage", Journal of Refrigeration, vol. 37, No. 1, Feb. 29, 2016, pp. 60-64.
Green, Kenneth D. et al.; "Candida cloacae oxidation of long-chain fatty acids to dioic acids"; Enzyme and Microbial Technology; vol. 27; Aug. 31, 2000; pp. 205-211.

(Continued)

*Primary Examiner* — Amy C Bonaparte
(74) *Attorney, Agent, or Firm* — NKL Law; Allen Xue

(57) ABSTRACT

A long-chain composition has at least one long-chain alkane selected from the group consisting of C9-18 linear or branched alkanes and at least one long-chain carboxylic acid selected from the group consisting of C9-18 linear or branched, saturated or unsaturated aliphatic monocarboxylic acids. The mass ratio of the long-chain alkane to the long-chain carboxylic acid ranges from 1:1 to 40:1. The long-chain composition has a higher fermentation degree or higher substrate utilization rate and the like, when used as a starting material in the production of long-chain dibasic acids via fermentation.

9 Claims, No Drawings

(56) References Cited

OTHER PUBLICATIONS

Ni, Haiyang; "CStudy on the preparation and heat storage performance of paraffin-based composite phase change materials" (Non-official translation); Kunming University of Science and Technology Master Thesis Jun. 15, 2018; pp. 1-2.

* cited by examiner

LONG-CHAIN COMPOSITION, LONG-CHAIN COMPOSITION SET, ITS PREPARATION AND APPLICATION THEREOF

TECHNICAL FIELD

The present application belongs to the field of biochemical engineering, and particularly relates to a long-chain composition or a long-chain composition set. The present application also relates to a method for producing the long-chain composition or the long-chain composition set, and application of the same in the production of long-chain dibasic acids.

BACKGROUND ART

Dodecanedioic acid (DDDA for short) is a type of aliphatic dicarboxylic acids with 12 carbon atoms in the carbon chain, which is a fine chemical product with important and wide industrial application, and is also an important starting material for synthesizing high-grade spices, high-performance nylon engineering plastics, high-grade nylon hot melt adhesives, high-temperature dielectrics, high-grade paints and coatings, high-grade lubricating oils, cold-resistant plasticizers, resins, medicines, pesticides and the like in chemical industry.

In the fermentation method for producing long-chain dibasic acids, methyl groups at two ends of a long-chain n-alkane is converted into carboxyl groups via $\alpha$, $\omega$-oxidization, respectively, by means of the specific oxidizing capability and the action of intracellular enzymes of microorganisms at normal temperature and normal pressure, resulting in various long-chain dibasic acids with corresponding chain lengths. There are many kinds of bacteria, molds and actinomycetes capable of producing long-chain dibasic acids through fermentation, among which yeasts of the genus Candida are highly productive microorganisms for producing dibasic acids through fermentation of n-alkanes.

In prior arts, normally yeasts are used as fermentation strains, and n-alkanes are used as a substrate to produce long-chain dibasic acids with corresponding carbon number. For example, CN102115767A, CN102115768A and the like provide the production schemes for undecanedioic acid and hexadecanedioic acid, respectively. In addition, CN103805643A discloses a method for producing long-chain dibasic acids, which comprises the steps of performing amplification culture on dibasic acid strains to obtain a seed broth, performing amplification fermentation on the seed broth, adding an emulsified alkane during the fermentation process, removing mycoprotein after completion of the reaction, and crystallizing to obtain a long-chain dibasic acid product.

SUMMARY OF THE INVENTION

The inventors of the present application have found that the prior arts still suffer from the problems of low fermentation degree or low substrate utilization when producing long-chain dibasic acids using n-alkane as a substrate. The present application has been accomplished based on this finding.

Specifically, the present application is directed to solutions of the following aspects.

1. A long-chain composition (preferably for use in fermentation), comprising at least one long-chain alkane selected from the group consisting of C9-18 linear or branched (preferably linear) alkanes (preferably at least one long-chain alkane selected from the group consisting of n-dodecane, n-tetradecane and n-hexadecane, particularly n-dodecane) and at least one long-chain carboxylic acid selected from the group consisting of C9-18 linear or branched (preferably linear), saturated or unsaturated (preferably saturated) aliphatic monocarboxylic acids (preferably at least one long-chain carboxylic acid selected from the group consisting of lauric acid, myristic acid and palmitic acid, particularly lauric acid), wherein the mass ratio of the long-chain alkane to the long-chain carboxylic acid ranges from 1:1 to 40:1 (preferably from 2:1 to 20:1 or from 5:1 to 10:1).

2. The long-chain composition according to any of the preceding or subsequent aspects, further comprising water, wherein the mass of the water is 0.5 to 10 times (preferably 1 to 5 times or 1 to 3 times) the sum of the mass of the long-chain alkane and the mass of the long-chain carboxylic acid.

3. The long-chain composition according to any of the preceding or subsequent aspects, wherein the composition has a pH ranging from 5 to 12 (preferably from 7 to 10, from 7.5 to 9 or from 7.5 to 8.0), and/or is present in the form of a liquid or a solid-liquid mixture (preferably in the form of a liquid, particularly an aqueous liquid) at 32° C., and/or the long-chain alkane and the long-chain carboxylic acid have the same number of carbon atoms.

4. A set of long-chain compositions, comprising n long-chain compositions according to any of the preceding or subsequent aspects present independently of each other (e.g. packaged or separated independently of each other), wherein n is a positive integer ranging from 2 to 40 (preferably from 4 to 20 or from 5 to 10), and where the mass ratio of long-chain alkane to long-chain carboxylic acid in the i-th (wherein i represents an arbitrary positive integer in the range from 2 to n) long-chain composition is $R_i$, the mass ratio of long-chain alkane to long-chain carboxylic acid in the first long-chain composition is $R_1$, and the mass ratio of long-chain alkane to long-chain carboxylic acid in the n-th long-chain composition is $R_n$, $R_{i-1}/R_n \geq 1$ (preferably $R_{i-1}/R_i=1-20$, $R_{i-1}/R_1=1.0001-10$, $R_{i-1}/R_1=1.001-10$, $R_{i-1}/R_1=1.01-10$, $R_{i-1}/R_1=1.1-5$, or $R_{i-1}/R_1=1.5-2$), and $R_1/R_n>1$ (preferably $R_1/R_n=1.0001-30$, $R_{i-1}/R_1=1.001-20$, $R_{i-1}/R_1=1.01-10$, $R_1/R_n=1.1-5$, or $R_1/R_n=1.5-2$).

5. The set of long-chain compositions according to any of the preceding or subsequent aspects, wherein the n long-chain compositions are produced separately, and/or the weight ratios between any two of the n long-chain compositions (calculated on the basis of the amount of long-chain composition) are the same or different (preferably the same or substantially the same), and/or the weight ratios between any two of the n long-chain compositions (calculated on the basis of the amount of long-chain alkane) are the same or substantially the same.

6. A method for producing a long-chain composition, preferably for use in fermentation, comprising at least one long-chain alkane selected from the group consisting of C9-18 linear or branched (preferably linear) alkanes (preferably at least one long-chain alkane selected from the group consisting of n-dodecane, n-tetradecane and n-hexadecane, particularly n-dodecane), and at least one long-chain carboxylic acid selected from the group consisting of C9-18 linear or branched (preferably linear), saturated or unsaturated (preferably saturated) aliphatic monocarboxylic acids (preferably at least one long-chain carboxylic acid selected from the group consisting of lauric acid, myristic acid and palmitic acid, particularly lauric acid), wherein the mass ratio of the long-chain alkane to the long-chain carboxylic acid ranges from 1:1 to 40:1 (preferably from 2:1 to 20:1 or from 5:1 to 10:1), said method comprising at least a mixing step of: mixing (preferably till uniform) the long-chain alkane and the long-chain carboxylic acid at said mass ratio, optionally under heating (preferably at a heating temperature of 45-70° C. or 50-60° C.) and stirring (preferably at a stirring speed of 50-250 rpm or 150-250 rpm), to obtain the long-chain composition.

7. The method according to any of the preceding or subsequent aspects, wherein water and a pH controlling agent (such as an alkali, particularly at least one selected from sodium hydroxide and potassium hydroxide) are further added in the mixing step, and/or the method further comprises a step of adding water and a pH controlling agent (such as an alkali, particularly at least one selected from sodium hydroxide and potassium hydroxide) to the long-chain composition, optionally under heating (preferably at a heating temperature of 45-70° C. or 50-60° C.) and stirring (preferably at a stirring speed of 50-250 rpm or 150-250 rpm), wherein the mass of the water is 0.5 to 10 times (preferably 1 to 5 times or 1 to 3 times) the sum of the mass of the long-chain alkane and the mass of the long-chain carboxylic acid, and the pH controlling agent is used in such an amount that the long-chain composition has a pH ranging from 5 to 12 (preferably from 7 to 10, from 7.5 to 9, or from 7.5 to 8.0).

8. A method for producing a long-chain dibasic acid, wherein the long-chain dibasic acid is at least one long-chain dibasic acid selected from the group consisting of C9-18 linear or branched (preferably linear), saturated or unsaturated (preferably saturated) aliphatic dicarboxylic acids (preferably at least one long-chain dibasic acid selected from the group consisting of dodecanedioic acid, tetradecanedioic acid and hexadecanedioic acid, particularly dodecanedioic acid), the method comprising the steps of:
(1) producing a long-chain composition according to the method as defined in any of the preceding or subsequent aspects, providing a long-chain composition according to any of the preceding or subsequent aspects, or providing a long-chain composition set according to any of the preceding or subsequent aspects, which are collectively referred to as long-chain composition;
(2) fermenting the long-chain composition in the presence of zymophyte and a fermentation medium to convert the long-chain composition into the long-chain dibasic acid.

9. The method according to any of the preceding or subsequent aspects, wherein the zymophyte is a yeast having a complete α, ω-oxidation pathway (preferably at least one yeast selected from the group consisting of candida, cryptococcus, endomyces, hansenula, pichia, rhodotorula, torulopsis, and trichosporon, more preferably at least one yeast selected from candida, particularly candida tropicalis, and more particularly candida tropicalis mutant strain PF-UV-56 (preserved at China General Microbiological Culture Collection Center with a collection number of CGMCC No. 0356)), and/or the fermentation medium comprises: 20 to 28 g/L of sucrose, 0.8 to 1.5 g/L of corn steep liquor, 2.0 to 4.0 g/L of yeast extract, 0.8 to 1.2 g/L of sodium chloride, 3.0 to 3.5 g/L of potassium dihydrogen phosphate, 1.2 to 1.8 g/L of magnesium sulfate, 1.2 to 4.8 g/L of urea, 1.5 to 2 g/L of ammonium sulfate and 1.5 to 1.8 g/L of sodium acetate.

10. The method according to any of the preceding or subsequent aspects, wherein the fermenting comprises the steps of:
a preliminary step of: mixing the zymophyte and the fermentation medium, fermenting for 5-60 hours (preferably 10-40 hours, more preferably 20-30 hours or 24 hours) to obtain a fermentation base solution,
a conversion step of: adding the long-chain composition into the fermentation base solution, and fermenting for 60-400 hours (preferably 100-300 hours, more preferably 100-160 hours or 100-140 hours) to convert the long-chain composition into the long-chain dibasic acid.

11. The method according to any of the preceding or subsequent aspects, wherein a seed broth of the zymophyte is added in an amount (by volume) of 2-30% (preferably 5-20% or 10-15%) of the total liquid-holding volume, and/or the fermentation reaction is carried out at a reaction temperature of 25-37° C., preferably 28-32° C., and/or the fermentation reaction is carried out at a stirring speed of 100-1000 rpm (preferably 120-500 rpm or 150-300 rpm), and/or the fermentation reaction is carried out at an aeration rate of 0.2-10.0 VVM (preferably 0.2-2.0 VVM or 0.5-1.0 VVM), and/or the fermentation reaction is carried out for a reaction time of 65 hours or longer (preferably more than 120 hours, more preferably 130-400 hours, 130-300 hours, 130-200 hours, or 138-160 hours), and/or the long-chain composition is added in an amount of 100-1000 g/L total liquid-holding volume (preferably 100-500 g/L total liquid-holding volume or 150-250 g/L total liquid-holding volume), and/or the fermentation medium is added in an amount of 12-80 g/L total liquid-holding volume (preferably 32-50 g/L total liquid-holding volume, 35-45 g/L total liquid-holding volume, or 37-42 g/L total liquid-holding volume).

12. The method according to any of the preceding or subsequent aspects, wherein in the preliminary step (preferably within 24 hours from the start of the preliminary step), the long-chain composition is not added, and the pH of the fermentation reaction is in an autogenous state (i.e., pH control is not performed), and/or, at the start of the conversion step (preferably 24 hours after the start of the preliminary step), the pH of the fermentation reaction is adjusted to between 6.0 and 7.5 (preferably between 6.8 and 7.0), and then the pH of the fermentation reaction is increased by 0.05 to 0.4 (preferably 0.1 to 0.3) at intervals of 5-60 hours (preferably at intervals of 10-40 hours or at intervals of 20-30 hours or at intervals of 24 hours) till the end of the fermentation reaction.

13. The method according to any of the preceding or subsequent aspects, wherein in the conversion step, the long-chain composition is added in n batches, and the time intervals between two adjacent batches may be the same or different (preferably being 5-60 hours, 10-40 hours, 20-30 hours, or 24 hours), wherein n is a positive integer ranging from 2 to 40 (preferably from 4 to 20 or from 5 to 10), or the long-chain composition is continuously added according to the reaction time.

14. The method according to any of the preceding or subsequent aspects, wherein a long-chain composition set according to any of the preceding or subsequent aspects is used, and the n long-chain compositions are added separately in the n batches (preferably in order from the first long-chain composition to the n-th long-chain composition), or the long-chain compositions are added continuously according to a function $R=f(t)$, wherein R is the mass ratio of the long-chain alkane to the long-chain carboxylic acid, t is the reaction time of the conversion step, and f( ) represents an arbitrary non-increasing function (preferably an arbitrary decreasing function, an arbitrary monotonically decreasing function, or an arbitrary linearly decreasing function).

15. The method according to any of the preceding or subsequent aspects, further comprising a step of separating the long-chain dibasic acid from the reaction product of the fermentation reaction.

The present application is also directed to solutions of the following aspects.

1. A method for producing dodecanedioic acids, characterized by comprising the steps of:
    (1) mixing dodecane and lauric acid in proportion, heating and stirring to fully dissolve the lauric acid, then adding water into the mixture, uniformly mixing, and adding an alkali to adjust the pH value to 7-9 to obtain a mixed substrate;
    (2) adding a zymophyte and a fermentation medium into a fermentation tank for fermentation, and supplementing the mixed substrate obtained in the step (1) during the fermentation process till the end of the fermentation;
    (3) subjecting the resultant obtained after the completion of the fermentation to demulsification, membrane filtration, acid precipitation, filtration and drying, to obtain the long-chain dibasic acid product.

2. The method according to any of the preceding or subsequent aspects, characterized in that: the mass ratio of the dodecane to the lauric acid in the step (1) ranges from 2:1 to 10:1, preferably from 5:1 to 10:1.

3. The method according to any of the preceding or subsequent aspects, characterized in that: in the step (1), the heating is conducted till a temperature of 45-70° C., preferably 50-60° C.; and the stirring speed is 50-250 rpm, preferably 150-250 rpm.

4. The method according to any of the preceding or subsequent aspects, characterized in that: in the step (1), the water is added in an amount of 1-3 times the mass of the mixture.

5. The method according to any of the preceding or subsequent aspects, characterized in that: in the step (1), the alkali is added after uniformly mixing to adjust the pH value to 7-9, preferably 7.5-8.0; and the alkali is at least one of sodium hydroxide and potassium hydroxide.

6. The method according to any of the preceding or subsequent aspects, characterized in that: the zymophyte used in the step (2) is a yeast having a complete α, ω-oxidation pathway, and preferably at least one of candida, cryptococcus, endomyces, hansenula, pichia, rhodotorula, torulopsis or trichosporon.

7. The method according to any of the preceding or subsequent aspects, characterized in that: the formulation of the fermentation medium used in the step (2) is as follows: 20-28 g/L of saccharose, 0.8-1.5 g/L of corn steep liquor, 2.0-4.0 g/L of yeast extract, 0.8-1.2 g/L of sodium chloride, 3.0-3.5 g/L of potassium dihydrogen phosphate, 1.2-1.8 g/L of magnesium sulfate, 1.2-4.8 g/L of urea, 1.5-2 g/L of ammonium sulfate and 1.5-1.8 g/L of sodium acetate.

8. The method according to any of the preceding or subsequent aspects, characterized in that: in the step (2), seed broth of the zymophyte is added in an amount of 5-20%, preferably 10-15%, relative to the volume of the fermentation broth.

9. The method according to any of the preceding or subsequent aspects, characterized in that: in the step (2), wherein the fermentation temperature was 25-37° C., preferably 28-32° C.; the stirring speed is 120-500 rpm, preferably 150-300 rpm; the aeration rate is 0.2-1.0 VVM, preferably 0.5-1.0 VVM; the fermentation time is 138-144 hours.

10. The method according to any of the preceding or subsequent aspects, characterized in that: a pH control is performed in the step (2) as follows: within 0-24 h of fermentation, pH control is not carried out; after 24 hours, the pH value is adjusted to a neutral range of 6.8-7.0; and then the pH value is increased by 0.1-0.3 at 24h intervals till the end of the reaction.

11. The method according to any of the preceding or subsequent aspects, characterized in that: in the step (2), the mixed substrate obtained in the step (1) is supplemented in an intermittent or flow feeding mode during the fermentation process.

12. The method according to any of the preceding or subsequent aspects, characterized in that: in the step (2), an intermittent feeding mode is adopted, and the feeding is completed in 5-10 batches; or a flow feeding mode is adopted, and the feeding speed is calculated according to the fermentation time.

13. The method according to any of the preceding or subsequent aspects, characterized in that: the demulsification in the step (3) is performed by adjusting the pH of the fermentation broth to 8.5-10, preferably 9-9.5, heating the fermentation broth to 75-90° C. and maintaining for 20-40 min.

14. The method according to any of the preceding or subsequent aspects, characterized in that: the membrane filtration in the step (3) is performed by filtering the demulsified broth through a membrane, and carrying out a solid-liquid separation to obtain a clear broth; the filtration temperature is 30-50° C., preferably 40-50° C., and the pore diameter of the membrane is 10-50 nm, preferably 20-25 nm.

15. The method according to any of the preceding or subsequent aspects, characterized in that: the acid precipitation in the step (3) is performed by adjusting the pH of the clear broth using an acidic pH controlling agent, and controlling the pH to 3-5, preferably 3-4, so as to precipitate the long-chain dibasic acid.

16. The method according to any of the preceding or subsequent aspects, characterized in that: the filtration in the step (3) is performed through plate-and-frame filtration at a filtration pressure of 0.5-1.0M Pa, and a filtration temperature of 20-30° C.; the drying temperature is 80-105° C., and the drying time is 5-20 h.

Technical Effects

Compared with the prior arts, the present application can realize at least one of the following technical effects, preferably all of them.

(1) in the long-chain composition of the present application, the mass ratio of the long-chain alkane to the long-chain carboxylic acid meets the requirement set forth in the present application, and when the long-chain composition is used in a fermentation process, the fermentation degree can be improved, and the problems that the long-chain carboxylic acid is poor in water solubility and is difficult to be used in a fermentation system can be solved.

(2) in the long-chain composition of the present application, in a preferred case, the two steps of physical dissolution and chemical dissociation are adopted, so that the dissolution effect of the long-chain carboxylic acid can be improved, the formation of polar soluble micelles from the long-chain alkane and the long-chain carboxylic acid can be promoted, and the fermentation degree can be further improved.

(3) in the method for producing the long-chain composition of the present application, in a preferred case, an alkaline adjustment scheme is adopted, so that the problem of pH fluctuation in the fermentation process caused by material supplement can be reduced, and the material is further supplemented in a flow feeding mode, so that the substrate utilization rate can be improved, and the fermentation degree can be improved.

(4) in the fermentation method of the present application, the long-chain carboxylic acid may also function as a carbon source, and a part of the long-chain carboxylic acid can be converted into an important intermediate metabolite, i.e. acetyl coenzyme A, directly through fatty acid metabolization, so that the biomass can be rapidly accumulated, the fermentation time can be shortened, and the production intensity of the long-chain dicarboxylic acid can be improved.

(5) in the fermentation method of the present application, in a preferred case, the fermentation degree and the production intensity of the long-chain dicarboxylic acid can be further improved by increasing the subsequent addition amount of the long-chain fatty acid during the fermentation.

DETAILED DESCRIPTION OF THE INVENTION

The present application will be illustrated in detail hereinbelow with reference to embodiments thereof, but it should be noted that the scope of the present application is not limited by those embodiments, but is defined by the appended claims.

All publications, patent applications, patents, and other references cited herein are incorporated by reference in their entirety. Unless defined otherwise, all technical and scientific terms used herein have the same meaning as commonly understood by those skilled in the art. In case of conflict, the contents described herein, including definitions, should prevail.

When a material, method, component, apparatus, or device described herein is modified by an expression "known to those skilled in the art", "commonly known in the art" or the like, it is to be understood that said material, method, component, apparatus, or device covers not only those conventionally used in the art at the time of filing the present application, but also those not commonly used at present but will become commonly known in the art to be suitable for a similar purpose.

In the context of the present application, the term "substantially" means that a deviation acceptable or considered reasonable to those skilled in the art, such as within ±10%, within ±5%, within ±1%, within ±0.5% or within ±0.1%, is allowable to be present.

In the context of the present application, the term "total liquid-holding volume" means the total volume of the liquid phase in the fermentor, typically being 70-80% of the volume of the fermentor.

In the context of the present application, unless specifically stated otherwise, all percentages, parts, ratios, etc. are expressed by weight and all pressures given are gauge pressures.

In the context of the present application, any two or more embodiments of the present application may be arbitrarily combined, and the resulting technical solution forms a part of the initial disclosure of the present application and falls within the scope of the present application.

According to an embodiment, the present application relates to a long-chain composition. The long-chain composition is preferably a long-chain composition for use in fermentation, and is particularly suitable for use as a starting material for producing a long-chain dibasic acid by fermentation.

According to an embodiment of the present application, the long-chain composition comprises at least one long-chain alkane selected from the group consisting of C9-18 linear or branched alkanes and at least one long-chain carboxylic acid selected from the group consisting of C9-18 linear or branched, saturated or unsaturated aliphatic monocarboxylic acids. Here, the long-chain alkane is preferably at least one long-chain alkane selected from the group consisting of C9-18 linear alkanes, more preferably at least one long-chain alkane selected from the group consisting of n-dodecane, n-tetradecane, and n-hexadecane, and particularly preferably n-dodecane. The long-chain carboxylic acid is preferably at least one long-chain carboxylic acid selected from the group consisting of C9-18 linear, saturated aliphatic monocarboxylic acids, particularly preferably at least one long-chain carboxylic acid selected from the group consisting of lauric acid, myristic acid, and palmitic acid, and particularly lauric acid.

According to an embodiment of the present application, the mass ratio of the long-chain alkane to the long-chain carboxylic acid is generally from 1:1 to 40:1, preferably from 2:1 to 20:1, or from 5:1 to 10:1.

According to an embodiment of the present application, the long-chain composition further comprises water. Here, the mass of the water is generally 0.5-10 times, preferably 1-5 times or 1-3 times the sum of the mass of the long-chain alkane and the mass of the long-chain carboxylic acid.

According to an embodiment of the present application, the pH of the long-chain composition is generally from 5 to 12, preferably from 7 to 10, from 7.5 to 9 or from 7.5 to 8.0. In the context of the present application, the method for measuring the pH of the long-chain composition may be a pH paper method or a glass electrode method.

According to an embodiment of the present application, the long-chain composition is present in the form of a liquid or a solid-liquid mixture, preferably a liquid, particularly an aqueous liquid, at 32° C. In the context of the present application, the term "liquid" encompasses both homogeneous and heterogeneous liquids, the latter being, for example, a multiphase liquid-like mixture of two or more liquids.

According to an embodiment of the present application, in the long-chain composition, the long-chain alkane and the long-chain carboxylic acid have the same number of carbon atoms, such as a combination of n-dodecane and lauric acid.

According to an embodiment of the present application, the present application also relates to a set of long-chain compositions, which comprises a plurality of long-chain compositions according to any embodiment(s) of the present application. Particularly, the set of long-chain compositions comprises n long-chain compositions according to any embodiment(s) of the present application independently of each other. Here, n is generally a positive integer ranging from 2 to 40, preferably from 4 to 20 or from 5 to 10. In addition, the expression "independently of each other" particularly means, for example, that the compositions are packed independently of each other or separated independently of each other, that is, separated in a plurality of compartments in the same package.

According to this embodiment of the present application, where in the i-th long-chain composition, the mass ratio of the long-chain alkane to the long-chain carboxylic acid is $R_i$, in the first long-chain composition, the mass ratio of the long-chain alkane to the long-chain carboxylic acid is $R_1$, and in the n-th long-chain composition, the mass ratio of the long-chain alkane to the long-chain carboxylic acid is $R_n$, then is generally $\geq 1$, preferably, $R_{i-1}/R_1=1$-20, $=1.0001$-10, $R_{i-1}/R_1=1.001$-10, $R_{i-1}/R_{1=1.01}$-10, $R_{i-1}/R_1=1.1$-5, or $=1.5$-2. Here, i is an arbitrary positive integer in the range from 2 to n.

According to this embodiment of the present application, it is preferable that $R_1/R_n>1$, preferably $R_1/R_n=1.0001$-30, $R_{i-1}/R_1=1.001$-20, $R_{i-1}/R_1=1.01$-10, $R_{i-1}/R_1=1.1$-5 or $R_{i-1}/R_1=1.5$-2.

According to an embodiment of the present application, in the set of long-chain compositions, the n long-chain compositions are produced separately from each other. The method for producing these long-chain compositions can be that as described hereinafter.

According to an embodiment of the present application, in the set of long-chain compositions, the weight ratios (calculated on the basis of the amount of long-chain composition) between any two of the n long-chain compositions may be the same or different, preferably the same or substantially the same.

According to another embodiment of the present application, the weight ratios (calculated on the basis of the amount of long-chain alkane) between any two of the n long-chain compositions in the set of long-chain compositions may be the same or substantially the same.

According to an embodiment of the present application, the long-chain composition may be produced by a single method. Particularly, for example, the method at least comprises the following mixing step.

Mixing step: mixing the long-chain alkane with the long-chain carboxylic acid at the mass ratio to obtain the long-chain composition. The mixing is optionally carried out under heating and stirring. As the heating, a heating temperature of 45-70° C. or 50-60° C. may be particularly mentioned. Further, as the stirring, a stirring speed of 50-250 rpm or 150-250 rpm may be particularly mentioned. Further, as the mixing, it is preferable to mix until uniform, till a uniform liquid mixture is obtained.

According to an embodiment of the present application, water and a pH controlling agent are further added in the mixing step of the method. Here, the pH controlling agent may include, for example, an alkali, and particularly at least one selected from sodium hydroxide and potassium hydroxide.

According to an embodiment of the present application, the method further comprises a step of adding water and a pH controlling agent to the long-chain composition. Here, the step is optionally carried out under heating and stirring. As the heating, a heating temperature of 45-70° C. or 50-60° C. may be particularly mentioned. Further, as the stirring, a stirring speed of 50-250 rpm or 150-250 rpm may be particularly mentioned. The pH controlling agent may include, for example, an alkali, and particularly at least one selected from sodium hydroxide and potassium hydroxide.

According to an embodiment of the present application, the mass of the water, when added, is generally 0.5-10 times, preferably 1-5 times or 1-3 times, the sum of the mass of the long-chain alkane and the mass of the long-chain carboxylic acid. According to an embodiment of the present application, the pH controlling agent, when added, is generally used in such an amount that the long-chain composition has a pH ranging from 5 to 12, preferably from 7 to 10, from 7.5 to 9, or from 7.5 to 8.0.

According to an embodiment of the present application, the present application also relates to a method for producing a long-chain dibasic acid. Here, the long-chain dibasic acid is at least one long-chain dibasic acid selected from the group consisting of C9-18 linear or branched, saturated or unsaturated aliphatic dicarboxylic acids, preferably at least one long-chain dibasic acid selected from the group consisting of C9-18 linear, saturated aliphatic dicarboxylic acids, preferably at least one long-chain dibasic acid selected from the group consisting of dodecanedioic acid, tetradecanedioic acid and hexadecanedioic acid, and particularly dodecanedioic acid.

According to an embodiment of the present application, the method comprises the steps of:

(1) providing a long-chain composition or a long-chain composition set (collectively referred to as long-chain composition) according to any one of the embodiments of the present application;

(2) fermenting the long-chain composition in the presence of zymophyte and a fermentation medium to convert the long-chain composition into the long-chain dibasic acid.

According to an embodiment of the present application, in the method, the zymophyte is a yeast having a complete α, ω-oxidation pathway, preferably at least one yeast selected from the group consisting of candida, cryptococcus, endomyces, hansenula, pichia, rhodotorula, torulopsis, and trichosporon, more preferably at least one yeast selected from candida, particularly candida tropicalis, and more particularly candida tropicalis mutant strain PF-UV-56 (preserved at China General Microbiological Culture Collection Center with a collection number of CGMCC No. 0356 on Aug. 31, 1998).

According to an embodiment of the present application, in the method, the fermentation medium may be a fermentation medium conventionally used in the art for producing long-chain dibasic acids through fermentation, and generally comprises 10-60 g/L of a carbon source, 1-10 g/L of a nitrogen source, 1-10 g/L of a phosphorus source, 0.1-50 ppm of a trace metal element source, and the like. Here, as the carbon source, for example, one or more selected from the group consisting of glucose, sucrose, maltose, fructose, molasses, glycerol, sorbitol, arabinose, rhamnose, methanol and ethanol may be mentioned. As the nitrogen source, for example, one or more selected from the group consisting of yeast extract, peptone, corn steep liquor, urea, ammonium salts and nitrate salts may be mentioned. As the phosphorus source, for example, one or more selected from the group consisting of orthophosphoric acid salt, monohydrogen phosphate and dihydrogen phosphate, and preferably one or more selected from the group consisting of potassium dihydrogen phosphate, dipotassium hydrogen phosphate, ammonium dihydrogen phosphate, diammonium hydrogen phosphate, sodium dihydrogen phosphate and disodium hydrogen phosphate, may be mentioned. As the source of the trace metal element, for example, one or more selected from the group consisting of sulfates, hydrochlorides, acetates and nitrates of sodium, potassium, calcium, magnesium, iron, copper, zinc and manganese, and preferably one or more selected from the group consisting of sodium chloride, sodium acetate, potassium chloride, magnesium sulfate, calcium chloride, iron chloride and copper sulfate, may be mentioned. Particularly, the fermentation medium preferably comprises: 20-28 g/L of sucrose, 0.8-1.5 g/L of corn steep liquor, 2.0-4.0 g/L of yeast extract, 0.8-1.2 g/L of sodium chloride, 3.0-3.5 g/L of potassium dihydrogen phosphate, 1.2-1.8 g/L of magnesium sulfate, 1.2-4.8 g/L of urea, 1.5-2 g/L of ammonium sulfate and 1.5-1.8 g/L of sodium acetate.

According to an embodiment of the present application, in the method, the fermentation reaction comprises at least the following two steps.

a preliminary step of: mixing the zymophyte and the fermentation culture medium, and fermenting for 5-60 hours to obtain the fermentation base solution. Here, the reaction time of the preliminary step is preferably 10-40 hours, more preferably 20-30 hours or 24 hours;

a conversion step of: adding the long-chain composition into the fermentation base solution, and fermenting for 60-400 hours so as to convert the long-chain composition into the long-chain dibasic acid. Here, the reaction time of the conversion step is preferably 100-300 hours, more preferably 100-160 hours or 100-140 hours. According to an embodiment of the present application, in the method, the addition amount (by volume) of the zymophyte seed broth is generally 2-30%, preferably 5-20% or 10-15% of the total liquid-holding volume.

According to an embodiment of the present application, in the method, the reaction temperature of the fermentation reaction is generally 25-37° C., preferably 28-32° C. According to an embodiment of the present application, in the method, the stirring speed of the fermentation reaction is generally 100-1000 rpm, preferably 120-500 rpm or 150-300 rpm.

According to an embodiment of the present application, in the method, the fermentation reaction is conducted at an aeration rate of generally 0.2-10.0 VVM, preferably 0.2-2.0 VVM or 0.5-1.0 VVM. According to an embodiment of the present application, in the method, the reaction time of the fermentation reaction is generally 65 hours or more, preferably more than 120 hours, more preferably 130-400 hours, 130-300 hours, 130-200 hours, or 138-160 hours. Here, the reaction time includes the reaction time of the preliminary step and the reaction time of the conversion step.

According to an embodiment of the present application, the amount of the long-chain composition added in the method is generally 100-1000 g/L total liquid-holding volume, preferably 100-500 g/L total liquid-holding volume or 150-250 g/L total liquid-holding volume.

According to an embodiment of the present application, in the method, the fermentation medium is added in an amount of typically 12-80 g/L total liquid-holding volume, preferably 32-50 g/L total liquid-holding volume, 35-45 g/L total liquid-holding volume, or 37-42 g/L total liquid-holding volume.

According to an embodiment of the present application, in the method, in the preliminary step, preferably within 24 hours from the start of the preliminary step, the long-chain composition is not added, and the pH of the fermentation reaction is in an autogenous state, that is, no pH control is performed in this step or during this period of time.

According to an embodiment of the present application, in the method, the pH of the fermentation reaction is adjusted to between 6.0 and 7.5, preferably between 6.8 and 7.0, at the start of the conversion step, preferably 24 hours after the start of the preliminary step. More preferably, then the pH of the fermentation reaction is increased by 0.05 to 0.4, preferably 0.1 to 0.3, at intervals of 5-60 hours, preferably at intervals of 10-40 hours or at intervals of 20-30 hours or at intervals of 24 hours till the end of the fermentation reaction.

According to an embodiment of the present application, in the method, in the conversion step, the long-chain composition is added in n batches (also referred to as intermittent feeding). Here, the time intervals between two adjacent batches can be the same or different, preferably the same. Examples of the time interval may include 5-60 hours, 10-40 hours, 20-30 hours, and 24 hours. In addition, n is a positive integer ranging from 2 to 40, preferably from 4 to 20 or from 5 to 10. According to an embodiment of the present application, in the method, in the conversion step, a set of long-chain compositions according to any one of the embodiments of the present application is used, the n long-chain compositions are added in n batches, respectively, and preferably in the order from the first long-chain composition to the n-th long-chain composition.

According to an embodiment of the present application, in the method, in the conversion step, the long-chain composition is continuously added according to the reaction time (also referred to as flow feeding). Here, the continuous addition may or may not be at a constant flow rate, preferably at a constant flow rate.

According to an embodiment of the present application, in the method, in the conversion step, the long-chain composition is added continuously according to a function $R=f(t)$. Here, R represents the mass ratio of the long-chain alkane to the long-chain carboxylic acid, t represents the reaction time of the conversion step, $f(\ )$ represents an arbitrary non-increasing function, preferably an arbitrary decreasing function, an arbitrary monotonically decreasing function, or an arbitrary linearly decreasing function.

According to an embodiment of the present application, the method further comprises a step of separating the long-chain dibasic acid from the reaction product (referred to as a fermentation broth) of the fermentation reaction. For example, after the completion of the fermentation reaction, the resultant is subjected to demulsification, membrane filtration, acid precipitation, filtration and drying to obtain the long-chain dibasic acid product.

According to an embodiment of the present application, the demulsification may be performed in any manner conventionally known in the art, and is not particularly limited. For example, the demulsification may be performed by adjusting the pH of the fermentation broth to 8.5-10, preferably 9-9.5, raising the temperature to 75-90° C., and maintaining for 20-40 min.

According to an embodiment of the present application, the membrane filtration may be performed in any manner conventionally known in the art, and is not particularly limited. For example, the membrane filtration may be performed by subjecting the demulsified fermentation broth to membrane filtration and then to a solid-liquid separation to obtain a clear broth. Here, the filtration temperature is generally from 30 to 50° C. and preferably from 40 to 50° C. The pore diameter of the membrane is generally from 10 to 50 nm, preferably from 20 to 25 nm.

According to an embodiment of the present application, the acid precipitation may be performed in any manner conventionally known in the art, and is not particularly limited. For example, the acid precipitation may be performed by adjusting the pH of the clear broth using an acidic pH controlling agent, and controlling the pH to 3-5, preferably 3-4, to precipitate the long-chain dibasic acid. Here, the acidic pH controlling agent is generally a strong acid, and may be at least one of sulfuric acid, hydrochloric acid, nitric acid, and the like.

According to an embodiment of the present application, the filtration may be performed in any manner conventionally known in the art, and is not particularly limited. For example, the filtration may be performed through plate-and-frame filtration. Here, the filtration pressure is generally from 0.5 to 1.0 MPa and the filtration temperature is generally at room temperature, for example from 20 to 30° C.

According to an embodiment of the present application, the drying may be performed in any manner conventionally known in the art, and is not particularly limited. For example, the drying temperature may be 80 to 105° C. and the drying time may be 5 to 20 hours.

EXAMPLES

The present application will be described in further detail below by way of examples, but the present application is not limited to the following examples.

The experimental procedures employed in the following examples and comparative examples, unless otherwise specified, are all those conventionally used in the art. The experimental materials used in the following examples and comparative examples are commercially available from biochemical stores, unless otherwise specified.

The total extraction yield T of the long-chain dibasic acid is calculated according to the following equation:

$$T = \frac{M}{C \times V} \times 100\%$$

wherein V represents the volume of the clear broth obtained after the long-chain dibasic acid fermentation broth is subjected to membrane filtration and removal of unreacted alkane, L; M represents the dry weight of the extracted long-chain dibasic acid, g; C represents the lower tank concentration of the long-chain dibasic acid, g/L.

The molar conversion rate K of the mixed substrates is calculated according to the following equation:

$$K = \frac{M/m}{M_1/m_1 + M_2/m_2} \times 100\%$$

wherein M represents the dry weight of the extracted long-chain dibasic acid, g; $M_1$ represents the mass of alkane, g; $M_2$ represents the mass of lauric acid, g; m represents the molecular weight of the long-chain dibasic acid; $m_1$ represents the molecular weight of the alkane; $m_2$ represents the molecular weight of the lauric acid.

The production intensity Q of the long-chain dicarboxylic acid is calculated according to the following equation:

$$Q \equiv \frac{C}{H}$$

wherein C represents the lower tank concentration of the long-chain dibasic acid, g/L; H represents the fermentation period, h.

In the examples of the present application, Candida tropicalis mutant PF-UV-56 was selected as the zymophyte strain to carry out long-chain alkane fermentation to produce long-chain dibasic acid, and the mutant was preserved at China General Microbiological Culture Collection Center with a collection number of CGMCC No. 0356.

Preparation of the fermentation seed broth: the slant preserved strain was inoculated into 4 5 L shake flasks (with the liquid-holding volume of the shake flask being 300 mL) for strain activation and cultivation at a culture temperature of 32° C. and a rotation number of the shaking incubator of 200 rpm. After 48 hours of cultivation, 1.2 L of the activated seed broth was taken as a fermentation seed broth.

The formulation of the fermentation medium was as follows: 20 g/L of sucrose, 0.8 g/L of corn steep liquor, 2.0 g/L of yeast extract, 0.8 g/L of sodium chloride, 3.0 g/L of potassium dihydrogen phosphate, 1.2 g/L of magnesium sulfate, 1.2 g/L of urea, 1.5 g/L of ammonium sulfate and 1.5 g/L of sodium acetate.

Example 1

(1) 1650 g of dodecane was taken, 330 g of lauric acid was added, the resultant was heated to 60° C., mixed and dissolved under a stirring speed of 150 rpm, then 1980 g of water was added, and after a thorough mixing solid sodium hydroxide was added to adjust the pH value of the system to 8, to obtain a mixed substrate.

(2) Fermentation of long-chain dibasic acid was conducted in a 15 L fermentation tank, under a total liquid-holding volume of 12 L, a zymophyte seed broth volume of 1.2 L, a fermentation temperature of 32° C., an aeration rate of 1.0 VVM, and a stirring speed of 250 rpm, wherein no pH control was carried out within 0-24 h of fermentation, the pH was adjusted to 7.0 after 24h, then the pH control value was increased by 0.15 at intervals of 24h, and the alkane/lauric acid mixed substrate prepared in the step (1) was added into the fermentation system in 5 batches at the time of 24h, 48 h, 72h, 96h and 120h of fermentation.

(3) The fermentation period was 145 h in total. After the completion of the fermentation, the fermentation broth was adjusted to a pH of 9.5, heated to 90° C., and maintained for 20 min; the demulsified fermentation broth was subjected to solid-liquid separation by membrane filtration to obtain a clear aqueous broth, under filtration conditions including a pore diameter of the membrane of 20 nm and a filtration temperature of 40° C.; concentrated sulfuric acid was added into the clear aqueous broth, adjusted to a pH of 3, and the long-chain dibasic acid in the clear aqueous broth was crystallized and separated out. The separated long-chain dibasic acid was subjected to plate-and-frame filtration and drying to obtain a long-chain dibasic acid crude product. The filtration conditions included: a filtration pressure of 0.5M Pa and a filtration temperature of 30° C. The drying conditions included a temperature of 80° C. and a drying time of 20 h.

The fermentation results were as follows: the fermentation concentration of the long-chain dibasic acid in the step (2) was 152.0 g/L, 13.4 L of clear fermentation broth was obtained after membrane filtration in the step (3), the mass of the crude long-chain dibasic acid product obtained after acid precipitation was 1914.5 g, the extraction yield of the crude acid was 94%, and the molar conversion rate of the mixed substrate of alkane and lauric acid was 62.4%.

Example 2

(1) 1900 g of dodecane was taken, 190 g of lauric acid was added, the resultant was heated to 60° C., mixed and dissolved under a stirring speed of 250 rpm, then 2090 g of water was added, and after a thorough mixing solid sodium hydroxide was added to adjust the pH value of the system to 7.5 to obtain a mixed substrate;

(2) Fermentation of long-chain dibasic acid was conducted in a 15 L fermentation tank, under a total liquid-holding volume of 12 L, a zymophyte seed broth volume of 1.2 L, a fermentation temperature of 32° C., an aeration rate of 1.0 VVM, and a stirring speed of 250 rpm, wherein no pH control was carried out within 0-24 h of fermentation, the pH was adjusted to 7.0 after 24h, then the pH control value was increased by 0.2 at intervals of 24h, and the alkane/lauric acid mixed substrate prepared in the step (1) was added into the fermentation system in 5 batches at the time of 24h, 48 h, 72h, 96h and 120h of fermentation.

(3) The fermentation period was 150 hours in total. After the completion of the fermentation, the fermentation broth was adjusted to a pH of 9, heated to 75° C., and maintained for 40 min; the demulsified fermentation broth was subjected to solid-liquid separation by membrane filtration to obtain a clear aqueous broth, under filtration conditions including a pore diameter of the membrane of 25 nm and a filtration temperature of 50° C.; concentrated sulfuric acid was added into the clear aqueous broth, adjusted to a pH of 4, and the long-chain dibasic acid in the clear aqueous broth was crystallized and separated out. The separated long-chain dibasic acid was subjected to plate-and-frame filtration and drying to obtain a dibasic acid crude product. The filtration conditions included: a filtration pressure of 1.0M Pa and a filtration temperature of 20° C. The drying conditions included a temperature of 105° C., and a drying time of 5 h.

The fermentation results were as follows: the fermentation concentration of the long-chain dibasic acid in the step (2) was 156.0 g/L, 13.6 L of clear fermentation broth was obtained after membrane filtration in the step (3), the mass of the crude long-chain dibasic acid product obtained after acid precipitation was 1973.0 g, the extraction yield of the crude acid was 93%, and the molar conversion rate of the mixed substrate of alkane and lauric acid was 60.2%.

Example 3

(1) 1650 g of dodecane was taken, 330 g of lauric acid was added, the resultant was heated to 60° C., mixed and dissolved under a stirring speed of 150 rpm, then 5940 g of water was added, and after a thorough mixing solid sodium hydroxide was added to adjust the pH value of the system to 8, to obtain a mixed substrate;

(2) Fermentation of long-chain dibasic acid was conducted in a 15 L fermentation tank, under a total liquid-holding volume of 12 L, a zymophyte seed broth volume of 1.2 L, a fermentation temperature of 32° C., an aeration rate of 1.0 VVM, and a stirring speed of 250 rpm, wherein no pH control was carried out within 0-24 h of fermentation, the pH was adjusted to 7.0 after 24h, then the pH control value was increased by 0.15 at intervals of 24h, and the alkane/lauric acid mixed substrate prepared in the step (1) was added into the fermentation system in a flow feeding mode from the time of 24h of fermentation, with a flow rate controlled to be 66 g/h.

(3) The fermentation period was 144 h in total. After the completion of the fermentation, the fermentation broth was adjusted to a pH of 9.5, heated to 90° C., and maintained for 20 min; the demulsified fermentation broth was subjected to solid-liquid separation by membrane filtration to obtain a clear aqueous broth, under filtration conditions including a pore diameter of the membrane of 20 nm and a filtration temperature of 40° C.; concentrated sulfuric acid was added into the clear aqueous broth, adjusted to a pH of 3, and the long-chain dibasic acid in the clear aqueous broth was crystallized and separated out. The separated long-chain dibasic acid was subjected to plate-and-frame filtration and drying to obtain a long-chain dibasic acid crude product. The filtration conditions included: a filtration pressure of 0.5M Pa and a filtration temperature of 30° C. The drying conditions included a temperature of 80° C. and a drying time of 20 h.

The fermentation results were as follows: the fermentation concentration of the long-chain dibasic acid in the step (2) was 153.0 g/L, 13.5 L of clear fermentation broth was obtained after membrane filtration in the step (3), the mass of the crude long-chain dibasic acid product obtained after acid precipitation was 1941.6 g, the extraction yield of the crude acid was 94%, and the molar conversion rate of the mixed substrate of alkane and lauric acid was 63.3%.

Comparative Example 1

The experiment was conducted as described in Example 1, except that the mixed substrate of alkane and lauric acid was not used in the step (1), and alkane with a total mass of 1980 g was added in batches only during the fermentation in the step (2). The fermentation period was 158 h in total, and the fermentation results were as follows: the fermentation concentration of the long-chain dibasic acid in the step (2) was 150.0 g/L, 13.0 L of clear fermentation broth was obtained after membrane filtration in the step (3), the mass of the crude long-chain dibasic acid product obtained after acid precipitation was 1833 g, the extraction yield of the crude acid was 94%, and the molar conversion rate of the mixed substrate of alkane and lauric acid was 58.2%.

Comparative Example 2

The experiment was conducted as described in Example 1, except that the mixed substrate of alkane and lauric acid was not used in the step (1), and lauric acid of a total mass of 1980 g was added in batches only during the fermentation in the step (2). The fermentation period was 155 h in total, and the fermentation results were as follows: the fermentation concentration of the long-chain dibasic acid in the step (2) was 15.0 g/L, 12.0 L of clear fermentation broth was obtained after membrane filtration in the step (3), the mass of the crude long-chain dibasic acid product obtained after acid precipitation was 169.2 g, the extraction yield of the crude acid was 94%, and the molar conversion rate of the mixed substrate of alkane and lauric acid was 6.3%.

Comparative Example 3

The experiment was conducted as described in Example 1, except that the mixed substrate of alkane and lauric acid was not used in step (1), and the alkane having a total mass of 1848 g was added in batches only during the fermentation in the step (2). The fermentation period was 150 hours in total, and the fermentation results were as follows: the fermentation concentration of the long-chain dibasic acid in the step (2) was 141.0 g/L, the clear fermentation broth obtained after membrane filtration in the step (3) was 12.9 L, the mass of the crude long-chain dibasic acid product obtained after acid precipitation was 1709.8 g, the extraction yield of the crude acid was 94%, and the molar conversion rate of the mixed substrate of alkane and lauric acid was 58.2%.

Example 4

The experiment was conducted as described in Example 1, except that, in the step (1), the alkane and lauric acid were mixed under stirring at room temperature, 1980 g of water was added, and after a thorough mixing solid sodium hydroxide was added to adjust the pH of the system to 8, to obtain a mixed substrate. The fermentation period was 144 h in total, and the fermentation results were as follows: after determination and calculation, the fermentation concentration of the long-chain dibasic acid in the step (2) was 142.0 g/L, 13.2 L of clear fermentation broth was obtained after membrane filtration in the step (3), the mass of the crude long-chain dibasic acid product obtained after acid precipitation was 1762 g, the extraction yield of the crude acid was 94%, and the molar conversion rate of the mixed substrate of alkane and lauric acid was 57.4%.

Example 5

The experiment was conducted as described in Example 1, except that, in the step (1), after the alkane and lauric acid were dissolved under stirring at 60° C., no aqueous solution was prepared by adding water, and the resultant was directly used in the fermentation process in step (2) without alkaline pH control. The fermentation period was 144 h in total, and the fermentation results were as follows: the fermentation concentration of the long-chain dibasic acid in the step (2) was 135.0 g/L, 13.0 L of clear fermentation broth was obtained after membrane filtration in the step (3), the mass of the crude long-chain dibasic acid product obtained after acid precipitation was 1650 g, the extraction yield of the crude acid was 94%, and the molar conversion rate of the mixed substrate of alkane and lauric acid was 53.8%.

Example 6

The experiment was conducted as described in Example 1, except that, in the step (1), after the alkane and lauric acid were dissolved under stirring at 60° C., water was added to obtain an aqueous solution, and the aqueous solution was directly used in the fermentation process in step (2) without alkaline pH control. The fermentation period was 145 hours in total, and the fermentation results were as follows: the fermentation concentration of the long-chain dibasic acid in the step (2) was 142.0 g/L, 13.5 L of clear fermentation broth was obtained after membrane filtration in the step (3), the mass of the crude long-chain dibasic acid product obtained after acid precipitation was 1802 g, the extraction yield of the crude acid was 94%, and the molar conversion rate of the mixed substrate of alkane and lauric acid was 58.7%.

Example 7

(1) 1800 g of dodecane was taken, 300 g of lauric acid was added, the resultant was heated to 60° C., mixed and dissolved at a stirring speed of 150 rpm, then 4200 g of water was added, and after a thorough mixing solid sodium hydroxide was added to adjust the pH value of the system to 7.5, to obtain a mixed substrate.

(2) Fermentation of long-chain dibasic acid was conducted in a 15 L fermentation tank, under a total liquid-holding volume of 12 L, a zymophyte seed broth volume of 1.2 L, a fermentation temperature of 32° C., an aeration rate of 1.0 VVM, and a stirring speed of 250 rpm, wherein no pH control was carried out within 0-24 h of fermentation, the pH was adjusted to 7.0 after 24h, then the pH control value was increased by 0.2 at intervals of 24h, and the alkane/lauric acid mixed substrate prepared in the step (1) was added into the fermentation system in 5 batches at the time of 24h, 48 h, 72h, 96h and 120h of fermentation.

(3) The fermentation period was 153 h in total. After the completion of the fermentation, the extraction of long-chain dibasic acid was carried out in the same manner as in the step (1) of Example 1.

The fermentation results were as follows: the fermentation concentration of the long-chain dibasic acid in the step (2) was 160.0 g/L, 13.6 L of clear fermentation broth was obtained after membrane filtration in the step (3), the mass of the crude long-chain dibasic acid product obtained after acid precipitation was 2030.4 g, the extraction yield of the crude acid was 94%, and the molar conversion rate of the mixed substrate of alkane and lauric acid was 62.2%.

Example 8

(1) 1650 g of dodecane was taken, 198 g of lauric acid was added, the resultant was heated to 60° C., mixed and dissolved at a stirring speed of 150 rpm, then 1848 g of water was added, and after a thorough mixing, solid sodium hydroxide was added to adjust the pH value of the system to 8, to obtain a mixed substrate.

(2) Fermentation of long-chain dibasic acid was conducted in a 15 L fermentation tank, under a total liquid-holding volume of 12 L, a zymophyte seed broth volume of 1.2 L, a fermentation temperature of 32° C., an aeration rate of 1.0 VVM, and a stirring speed of 250 rpm, wherein no pH control was carried out within 0-24 h of fermentation, the pH was adjusted to 7.0 after 24h, then the pH control value was increased by 0.2 at intervals of 24h, and the alkane/lauric acid mixed substrate prepared in the step (1) was added into the fermentation system in 5 batches at the time of 24h, 48 h, 72h, 96h and 120h of fermentation.

(3) The fermentation period was 142 h in total. After the completion of the fermentation, the extraction of long-chain dibasic acid was carried out in the same manner as in the step (1) of Example 1.

The fermentation results were as follows: the fermentation concentration of the long-chain dibasic acid in the step (2) was 148.0 g/L, 12.9 L of clear fermentation broth was obtained after membrane filtration in the step (3), the mass of the crude long-chain dibasic acid product obtained after acid precipitation was 2048.9 g, the extraction yield of the crude acid was 94%, and the molar conversion rate of the mixed substrate of alkane and lauric acid was 62.1%.

Example 9

The experiment was conducted as described in Example 1, except that, in the step (1), a combination of tetradecane and myristic acid was used instead of the combination of alkane and lauric acid. The fermentation period was 144 h in total, and the fermentation results were as follows: the fermentation concentration of the long-chain dibasic acid in the step (2) was 115.0 g/L, 13.0 L of clear fermentation broth was obtained after membrane filtration in the step (3), the mass of the crude long-chain dibasic acid product obtained after acid precipitation was 1405.3 g, the extraction yield of the crude acid was 94%, and the molar conversion rate of the mixed substrate of alkane and lauric acid was 53.2%.

Example 10

The experiment was conducted as described in Example 1, except that, in the step (1), a combination of hexadecane and palmitic acid was used instead of the combination of alkane and lauric acid. The fermentation period was 144 h in total, and the fermentation results were as follows: the fermentation concentration of the long-chain dibasic acid in the step (2) was 98.0 g/L, 13.0 L of clear fermentation broth was obtained after membrane filtration in the step (3), the mass of the crude long-chain dibasic acid product obtained after acid precipitation was 1197.6 g, the extraction yield of the crude acid was 94%, and the molar conversion rate of the mixed substrate of alkane and lauric acid was 51.6%.

Example 11

(1) 1650 g of dodecane was taken and divided into 5 parts of 330 g each, and then 33.0 g, 36.3 g, 39.6 g, 42.9 g and 46.2 g of lauric acid were respectively added to form mixtures containing alkane and lauric acid in different proportions, which were designated as Nos. 1-5. The pretreatment of the mixture of alkane and lauric acid was carried out in the same manner as in the step (1) of Example 1.

(2) Fermentation of long-chain dibasic acid was carried out in the same manner as in the step (2) of Example 1, except that the alkane/lauric acid mixed substrate prepared in the step (1) was sequentially added into the fermentation system in the order of No. 1 to No. 5 at the time of 24 h, 48 h, 72 h, 96 h, and 120 h of fermentation.

(3) The fermentation period was 140 h in total. After the completion of the fermentation, the extraction of crude long-chain dibasic acid was carried out in the same manner as in the step (3) of Example 1.

The fermentation results were as follows: the fermentation concentration of the long-chain dibasic acid in the step (2) was 149.0 g/L, 13.0 L of clear fermentation broth was obtained after membrane filtration in the step (3), the mass of the crude long-chain dibasic acid product obtained after acid precipitation was 1820.8 g, the extraction yield of the crude acid was 94%, and the molar conversion rate of the mixed substrate of alkane and lauric acid was 63.0%.

Example 12

(1) 1650 g of dodecane was taken and divided into 5 parts of 330 g each, and then 52.8 g, 56.1 g, 59.4 g, 62.7 g and 66.0 g of lauric acid were respectively added to form mixtures containing alkane and lauric acid in different proportions, which were designated as Nos. 1-5. The pretreatment of the mixture of alkane and lauric acid was carried out in the same manner as in the step (1) of Example 1.

(2) Fermentation of long-chain dibasic acid was carried out in the same manner as in the step (2) of Example 1, except that the alkane/lauric acid mixed substrate prepared in the step (1) was sequentially added into the fermentation system in the order of No. 1 to No. 5 at the time of 24 h, 48 h, 72 h, 96 h, and 120 h of fermentation.

(3) The fermentation period was 140 h in total. After the completion of the fermentation, the extraction of crude long-chain dibasic acid was carried out in the same manner as in the step (3) of Example 1.

The fermentation results were as follows: the fermentation concentration of the long-chain dibasic acid in the step (2) was 154.0 g/L, 13.4 L of clear fermentation broth was obtained after membrane filtration in the step (3), the mass of the crude long-chain dibasic acid product obtained after acid precipitation was 1939.8 g, the extraction yield of the crude acid was 94%, and the molar conversion rate of the mixed substrate of alkane and lauric acid was 64.2%.

Example 13

(1) 1650 g of dodecane was taken and divided into 5 parts of 330 g each, then 33.0 g, 36.3 g, 39.6 g, 42.9 g and 46.2 g of lauric acid were respectively added, and after being heated and dissolved in the same manner as in the step (1) of Example 1, water was respectively added to control the total mass to 768 g. Solid sodium hydroxide was further added to adjust the pH of the system to 7.5, to obtain mixtures containing alkanes and lauric acid in different proportions, designated as Nos. 1-5.

(2) Fermentation of long-chain dibasic acid was carried out as described in the step (2) of Example 1, except that the alkane/lauric acid mixed substrate prepared in the step (1) was sequentially added into the fermentation system in a flow feeding manner at a constant flow rate in the order of No. 1 to No. 5 within the time of 24h-48 h, 48 h-72 h, 72 h-96 h, 96h-120h and 120 h-144 h of fermentation, with the flow rate controlled to be 32 g/h.

(3) The fermentation period was 144 h in total. After the completion of the fermentation, the extraction of crude long-chain dibasic acid was carried out in the same manner as in the step (3) of Example 1.

The fermentation results were as follows: the fermentation concentration of the long-chain dibasic acid in the step (2) was 152.0 g/L, 13.2 L of clear fermentation broth was obtained after membrane filtration in the step (3), the mass of the crude long-chain dibasic acid product obtained after acid precipitation was 1886.0 g, the extraction yield of the crude acid was 94%, and the molar conversion rate of the mixed substrate of alkane and lauric acid was 65.3%.

The invention claimed is:

1. A long-chain composition, comprising at least one long-chain alkane selected from the group consisting of n-dodecane, n-tetradecane, and n-hexadecane and at least one long-chain carboxylic acid selected from the group consisting of lauric acid, myristic acid, and palmitic acid, wherein the long-chain alkane and the long-chain carboxylic acid have the same number of carbon atoms, and the mass ratio of the long-chain alkane to the long-chain carboxylic acid ranges from 2:1 to 20:1, and the long-chain composition further comprises water and has a pH value ranging from 7.5 to 10, and the mass of the water is 0.5 to 10 times the sum of the mass of the long-chain alkane and the mass of the long-chain carboxylic acid.

2. The long-chain composition of claim 1, wherein the mass of the water is 1 to 5 times the sum of the mass of the long-chain alkane and the mass of the long-chain carboxylic acid.

3. The long-chain composition of claim 1, wherein the mass of the water is 1 to 3 times the sum of the mass of the long-chain alkane and the mass of the long-chain carboxylic acid.

4. The long-chain composition of claim 1, which is present in the form of a liquid or a solid-liquid mixture at 32° C.

5. A set of long-chain compositions, comprising n long-chain compositions according to claim 1 present independently of each other, wherein n is a positive integer ranging from 2 to 40, and where the mass ratio of long-chain alkane to long-chain carboxylic acid in the i-th long-chain composition is $R_i$, wherein i represents an arbitrary positive integer in the range from 2 to n, the mass ratio of long-chain alkane to long-chain carboxylic acid in the first long-chain composition is $R_1$, and the mass ratio of long-chain alkane to long-chain carboxylic acid in the n-th long-chain composition is $R_n$, then $R_{i-1}/R_i$=1-20 and $R_1/R_n$=1.0001-30.

6. The set of long-chain compositions of claim 5, wherein n is a positive integer ranging from 4 to 20, and/or $R_{i-1}/R_i$=1.0001-10, and/or $R_1/R_n$=1.01-10.

7. The set of long-chain compositions of claim 5, wherein the weight ratios between any two of the n long-chain compositions (calculated on the basis of the amount of long-chain composition) are the same or different, and/or the weight ratios between any two of the n long-chain compositions (calculated on the basis of the amount of long-chain alkane) are the same or substantially the same, and/or n is a positive integer ranging from 5 to 10, and/or $R_{i-1}/R_i$=1.5-2, and/or $R_1/R_n$=1.5-2.

8. The long-chain composition of claim 1, wherein the long-chain composition is to be used in fermentation.

9. The long-chain composition of claim 8, wherein the fermentation is carried out by fermenting the long-chain composition in a fermentation base solution to produce a long-chain dibasic acid.

* * * * *